Patented Sept. 18, 1951

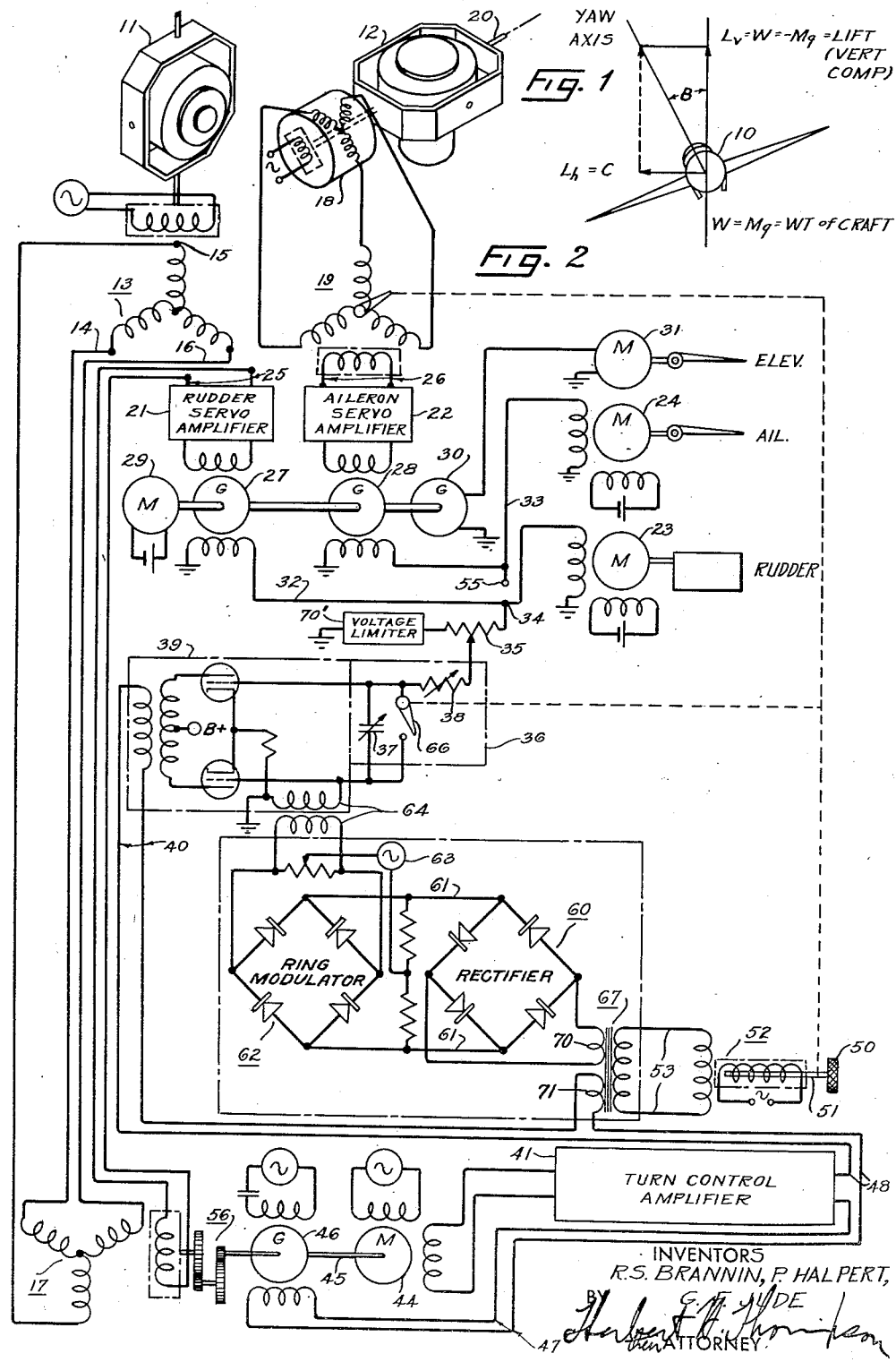
Sept. 18, 1951  R. S. BRANNIN ET AL  2,567,922
AUTOMATIC PILOT FOR AIRCRAFT
Filed Feb. 26, 1946  2 Sheets-Sheet 1
INVENTORS
R.S. BRANNIN, P. HALPERT,
G. H. HYDE
ATTORNEY

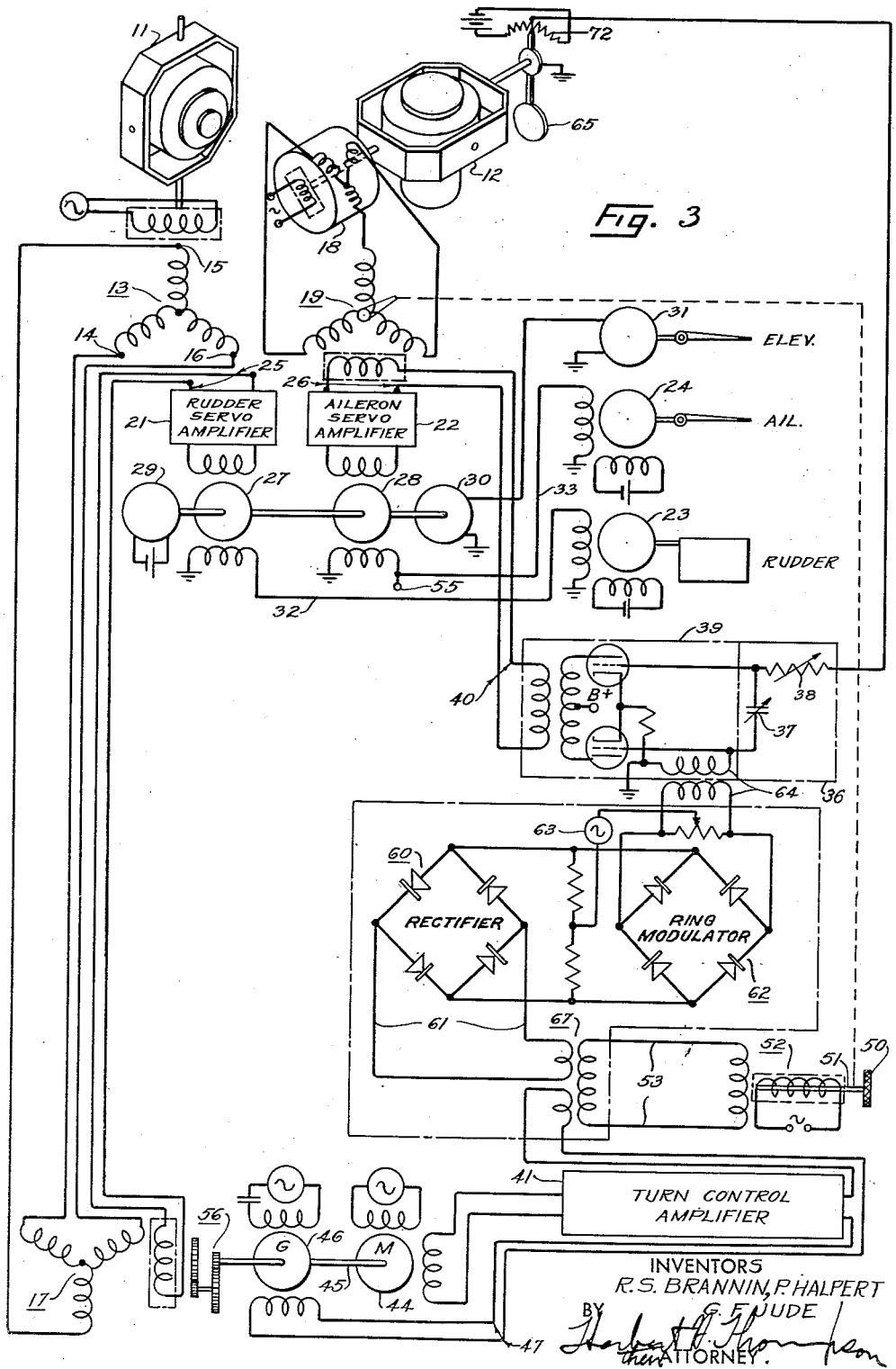

2,567,922

UNITED STATES PATENT OFFICE 2,567,922

AUTOMATIC PILOT FOR AIRCRAFT

Richard S. Brannin, East Williston, Percy Halpert, Hempstead, and George F. Jude, Richmond Hill, N. Y., assignors to The Sperry Corporation, a corporation of Delaware Application February 26, 1946, Serial No. 650,374

12 Claims. (Cl. 244—77)

The present invention relates to improvements in aircraft automatic pilots and, more particularly, to automatic pilots including means for executing coordinated turns.

Automatic pilots for aircraft generally include a directional gyroscope for establishing a stable heading reference, a gyro vertical or artificial horizon for establishing a stable vertical reference, and servo or positional control systems responsive to the indications of the gyros and operative through suitable relays or amplifiers to control the rudder, ailerons and elevator in a manner to stabilize the aircraft in some predetermined heading and attitude.

It is desirable to be able to employ the automatic pilot not merely for stabilizing the aircraft in straight flight, but also for making turns under automatic control. Automatic turn control offers the possibility of a high precision flight path, a valuable feature in airport approach and landing maneuvers and likewise in certain military maneuvers.

Execution of perfect turns under automatic control is a problem of considerable difficulty, especially when the wide range of rate of turn and air speed in modern aircraft is considered. Turn coordination requires a continuous correlation throughout the turn of three variables: rate of turn, air speed and bank angle. Unless these variables are correctly correlated, the aircraft will sideslip or skid, for reasons more fully described below. These conditions not only make for discomfort to the passengers but also, if they are not corrected, may result in putting the aircraft in a dangerous attitude.

In an application filed on February 23, 1946, by Percy Halpert, for improvements in Aircraft Automatic Pilots, Serial No. 649,601, assigned to the assignee of the present application, there is disclosed and claimed apparatus for automatically making coordinated turns, that is, turns which are free from sideslip or skid, over a wide range of rates of turn and air speeds. The apparatus is based on the principle that in a turn made under control of an automatic pilot, any error in coordination will reveal itself as a persistent signal in the output of the rudder or aileron servo system, or both, and that this signal can be employed to adjust the rudder in a manner to reduce the rudder signal to zero and thereby coordinate the turn. In the apparatus of the acknowledged application, means are provided for initially banking the aircraft to some angle to initiate a turn and simultaneously applying a continuously varying heading signal to the rudder servo circuit so that during the turn the rudder is centralized so long as the rate of turn is identical to that set by the varying heading signal. If the rate of turn of the aircraft departs from this value, a rudder signal appears. Means are provided for tapping this signal and applying it, after smoothing or integration, to the rudder servo energization circuit.

The present invention resides primarily in an improvement in such turn control system, but it is also applicable to other turn control systems.

We have found that improved turn control is obtained if the amount of corrective signal supplied to the heading-varying means is adjusted in accordance with bank angle. Thus, for gentle turns at low speed at small bank angles we find it desirable to apply only a weak corrective signal, while for steep turns at large bank angles and high speed a strong corrective signal gives better results. Not only are turns made more smoothly under widely varying conditions, but also a source of possible trouble is avoided. For example, an unbalanced thrust condition, such as a dead engine on a multi-engined aircraft, calls for continuous rudder signal to hold the aircraft on a straight heading. In making a gentle turn, the spurious turn correction signal derived from the rudder signal might actually be enough to cause the aircraft to turn in the wrong direction. This possibility is avoided in the present invention, since no matter how much rudder servo signal may exist, the amount of it that can act to readjust the rate of turn is limited as a function of bank angle, being zero in level flight. In addition, with our invention it is unnecessary to introduce a correction for varying air speed as has heretofore been proposed in the prior art, since our banking angle correction renders this complication unnecessary.

The invention aids in securing coordinated turns in installations in a wide variety of commercial and military aircraft which are called on to make turns under widely varying conditions of air speed, bank angle and rate of turn. Turn control apparatus in accordance with the invention has a breadth of application and utility that is not shared by most previously devised systems.

In one particularly advantageous embodiment of the invention, the tapped rudder servo signal, which is a direct current voltage, is applied to a smoothing or integrating network of suitable time delay constant and thence to a modulator to obtain an alternating current signal corresponding in amplitude and phase to the amplitude or magnitude and polarity of the direct current signal. The alternating current signal is supplied to the heading varying means in a manner to correct the rate of turn until the rudder servo signal becomes zero. The alternating current supply for the modulator is adjusted as a function of bank angle, so that the maximum amplitude of the turn correction signal is a function of bank angle, and is zero at zero bank angle.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In the accompanying drawings there are shown diagrammatically two examples of specific embodiments of apparatus within the purview of the invention, and a diagram illustrative of certain principles underlying the invention. In the drawings, Fig. 1 is a diagram showing relations between bank angle and other quantities during turn of an aircraft, Fig. 2 is a diagrammatic showing of an embodiment of the invention wherein the turn correction signal is obtained from the rudder servo energization circuit, and Fig. 3 is a diagrammatic showing of an embodiment wherein the turn correction signal is obtained from a side slip detector.

As an aid to an understanding of the invention there is shown in the diagram of Fig. 1 the relation between bank angle and other quantities in the case of an aircraft, indicated at 10, during a turn.

An aircraft in straight and level flight represents an equilibrium of forces wherein drag is balanced by thrust, and weight by the vertical component ($L_v$) of lift. Lift is the component of the resultant force acting on an aircraft in a direction at right angles to the relative wind. In straight and level flight L is vertical and is equal to the weight of the aircraft.

To make a turn, the aircraft is banked to some angle B (in level flight B is the angle between vertical, and the normally-vertical axis of the aircraft or, what amounts to the same thing, the angle between a line through the wing tips and horizontal). This action establishes a horizontal component of lift $L_h$ which furnishes centripetal force C to make the aircraft turn at some rate S. The function of $L_h$ is analogous to the function of a string in the case of a stone being whirled; it constrains the object to a circular path in lieu of its normal straight path.

Centripetal force, $C = L_h = MV^2/R = MVS$ where M is the mass of the aircraft. Since $\tan B = L_h/L_v = L_h/Mg$, then $\tan B = VS/g$, where $g$ is the acceleration of gravity. Thus, for a given bank angle B and air speed V, one definite rate of turn S is required if the correct centripetal force is to be obtained. If the above relation between B, V, S and $g$ is departed from, side slip or skid will occur, according to whether there is a deficiency or an excess of centripetal force.

For the above relations to hold exactly, the lift L of the aircraft is assumed to be increased during the turn to a value L' as by adjustment of the elevator so as to keep the vertical component of lift, $L_v$, the same as in level flight.

As shown in Fig. 2, the apparatus to which the invention is applied includes a directional gyro 11 and a gyro vertical 12 mounted in an aircraft (not shown). The directional gyro is provided with a pickoff or synchro 13 shown as of the Selsyn transmitter type, which is connected via leads 14, 15, 16 with a second signal generator Selsyn 17 which furnishes a signal to control the rudder upon relative turn of the ship and gyroscope. By adjustment of the armature of Selsyn 17 the angular relation between the aircraft and the gyro can be changed at will to fly any desired heading or to make turns in a manner to be described. The gyro vertical is provided at 18 and 19 with a similar pair of Selsyn pickoffs on the roll axis 20, for control of the aircraft in roll or bank.

The outputs of Selsyns 17 and 19 are delivered via leads 25, 26 to servo amplifiers 21, 22 of conventional phase sensitive type, which in the system shown are arranged to control rudder and aileron servomotors 23, 24 through the agency of a motor-generator set of the Ward-Leonard type. Thus, the outputs of the amplifiers energize the field circuits of the direct current generators 27 and 28, the armature circuits of which energize the armatures of the servomotors via leads 32 and 33 and ground. The generators are driven by a motor 29. A similar pickoff system (not shown) is usually provided for the pitch axis of the gyro vertical, to control the elevator servo generator 30 and servomotor 31.

In the system so far described, deviation of the aircraft from a heading or bank angle predetermined by the settings of Selsyns 17 and 19 is detected by the gyros and corrected by the rudder and aileron servo systems, which apply corrective control moments in a way known per se.

The rudder servo energization lead is tapped at 34 and the rudder signal employed to adjust the rate of turn in a sense to make the rudder signal zero. Thus the rudder signal is taken off via a potentiometer 35 and applied to an integrating network 36 comprising capacitance 37 and resistance 38, and thence to a modulator 39.

The purpose of the modulator is to obtain an alternating output voltage at 40 of amplitude and phase corresponding to the amplitude and polarity of the direct current signal at 35. In accordance with the invention, the amplitude of this voltage is also made a function of bank angle. For this purpose there is required for the modulator an alternating current voltage of amplitude proportional to bank angle but which is constant as to phase, since the effect on the turn correction voltage should be the same for a given bank angle whether the bank be to the right or to the left. Signal generator 52, shown in the form of a variotransformer, produces a signal of amplitude and phase corresponding to the bank angle and sense of bank respectively. This voltage is applied via leads 53 to transformer 67 shown as having two secondaries 70 and 71, the former being connected to a full-wave rectifier 60, the output of which at 61 is direct current of magnitude corresponding to bank angle and of constant polarity. This direct current signal is applied to a ring modulator including a rectifier bridge 62 of known type, supplied with alternating current from source 63. The output of the ring modulator furnishes the supply for modulator 39, being coupled thereto by a transformer 64. Thus the signal in leads 40 is of amplitude and phase corresponding to the servo signal amplitude and polarity, its amplitude but not its phase being additionally modified in accordance with bank angle.

A turn control amplifier 41 of the character described in the aforementioned Halpert application provides an output which drives motor 44, the shaft 45 of which carries the stator of Selsyn 17, through reduction gearing indicated at 56 to give a slow, continuous change of heading. The motor also drives a speed generator 46, the output of which is supplied via leads 47 to the input 48 of the amplifier, so the speed of the motor is made accurately proportional to the amplifier signal.

A turn control knob 50 is provided which is adapted, on displacement from zero or detent position, to twist the aileron Selsyn 19, which is mounted on the knob shaft 51, so as to cause the aircraft to roll or bank and thereby initiate a turn. The knob also operates the signal generator 52 on the same shaft 51, so constructed and arranged as to supply at 53 a voltage of amplitude and phase corresponding to the amount and sense of the displacement of the knob. That is, the voltage at 53 is proportional to the bank angle set in by the knob, from which it follows that the voltage supplied to rectifier 60 from secondary 70 is proportional to the bank angle as is also the voltage supplied by the second secondary 71 to the turn control amplifier 41 through leads 48.

A switch 66 is provided, preferably operable from the turn knob 50 and arranged to short-circuit condenser 37 and thereby render the error correction circuit inoperative except when the knob is set to initiate a turn.

The factor of proportionality between voltage 53 and the amount of bank set in by knob 50 depends on the relation $B = \tan^{-1} VS/g$, and is ordinarily adjusted so that this relation will be satisfied at the minimum cruising speed of the aircraft for which the apparatus is intended. However, if desired, the adjustment can be with respect to any other air speed since error is corrected in any case.

A voltage limiter 70' is advantageously inserted between the resistor 35 and ground, to permit the use of very high sensitivity to errors in turn rate and to limit the charging rate of condenser 37 to obtain short period stabilization and long period error correction. The limiter may take the form of a pair of copper oxide rectifiers connected back to back or other circuit elements having a non-linear current-voltage characteristic.

In operation, to make a turn, the knob 50 is displaced so as to bank the aircraft, thereby initiating a turn, and to set up a proportional rate of turn. A voltage appears in secondary 71 as described, which is amplified in 41 and which drives motor 44 at a rate proportional to the voltage. The motor rotates Selsyn 17 at some rate which corresponds to the correct rate of turn for the selected air speed, but which will be high for air speeds greater than this.

If the aircraft is turning at the correct rate, the rotation of Selsyn 13 relative to the directional gyro is exactly matched by the rotation of Selsyn 17 by the motor 44, and the output at 25 is zero. Hence, under such conditions there is no signal at the rudder servo amplifier and the rudder remains centralized.

On the other hand if the rate of turn is incorrect for the particular bank angle and air speed, Selsyn 17 rotates at a different rate from that of Selsyn 13 relative to the gyro and a signal appears at 25 which causes deflection of the rudder.

This rudder signal tapped at 34 into the field current supply for generator 27 is converted to alternating current by modulator 39, as described, and is supplied to the amplifier input so that it is added to or subtracted from the turn knob signal, and thus changes the speed of turning of Selsyn 17 until the output at 25 approaches zero. The turn is then properly coordinated.

The rapidity of the correction of rate of turn upon appearance of a given rudder signal is determined by the setting of potentiometer 35 in combination with adjustment of resistance 38 and capacitance 37. In general, these constants are adjusted so that several seconds are required for a rudder signal to become fully effective to change the rate of turn. This makes it possible for short-period deviations of the aircraft due to gusts which last a fraction of a second up to a second or two, to be corrected by the gyro and servo system in the usual way, while a persistent rudder signal is corrected in the manner described.

In turns made at small bank angles the maximum amount of turn correction signal is smaller than at large bank angles. By suitable adjustment of circuit constants, the sensitivity of the turn correction can be made to vary in a manner affording optimum conditions for turns at any bank angle, rate or air speed encountered in conditions wherein an automatic pilot is employed. In other words, by use of the present invention the automatic pilot is rendered as versatile in turning maneuvers as in other maneuvers. The advantages of the invention are especially apparent during the initial and final stages of the turn. Since the effectiveness of the correction system increases gradually from zero as the aircraft rolls into the turn, there is no opportunity for an excessive correction signal to occur at this time with resulting irregularity in movement of the aircraft. In other words, the correction signal is applied, and removed, smoothly and gradually at the beginning and end of the turn.

Although the invention has been described with principal reference to correction of the rate of turn in response to a persistent rudder signal as indicative of the presence and magnitude of side slip, it is advantageous in some cases to correct the rate of turn in response to a persistent aileron signal which is also indicative of side slip since in an incorrectly coordinated turn (i. e., in the presence of side slip) the ailerons are usually displaced from norm. The aileron signal can be tapped at 55, as by connecting potentiometer 35 to this point instead of to point 34. Again, in some cases it is desirable to coordinate a turn by adjustment of the ailerons rather than by adjustment of the rate of turn. This can be done as shown in Fig. 3 by supplying the output of modulator 39 to the input of the aileron servo amplifier at 26 instead of to the turn control amplifier.

The invention is useful in turn control systems wherein side slip or skid is detected by a pendulum, wind vane, Pitot tubes or other side slip detector. One such modification is illustrated in the apparatus of Fig. 3, which is similar to Fig. 2 except that the side slip responsive signal is obtained from a pendulum 65 pivoted on an axis parallel to the longitudinal axis of the aircraft instead of by the presence of a persistent rudder displacement or aileron displacement signal. A reversible signal is shown as obtained from the pendulum 65 by means of a mid-tapped potentiometer 72, the output being fed into the integrating network 36 as in Fig. 1. Sensitivity of the turn correction is varied as a function of bank angle in the manner described for Fig. 2.

An additional advantage of the error correction system of the invention is that it affords full correction for the so-called gimbal error, characteristic of directional gyros as they are ordinarily mounted. During a banked turn at a rate which actually is constant with respect to the earth, the movement of the aircraft relative to the gyro does not take place at a constant rate. Instead it is retarded and accelerated in a cyclic manner, with maxima and minima occurring at certain orientations of the gyro relative to the aircraft. Gimbal error can thus give rise to spurious signals which would tend to change the rate of turn when such adjustment is not necessary. In the present apparatus the spurious signals are integrated and are not permitted to affect the turn.

In actual practice, the apparatus of the invention functions satisfactorily to make coordinated turns over a range of bank angles, rates of turn and air speeds which is sufficient to take care of the requirements of a wide variety of military and civilian aircraft. The present system works well in rough air and under abnormal conditions, such as flight with one or more engines dead.

In conventional aircraft, the members for controlling heading and bank angle take the form of rudder and ailerons respectively. However, the invention is not restricted to use with control surfaces. For example, in multi-engine aircraft the throttles can be employed to aid in steering, and in certain aircraft spoilers are used to supplement the ailerons in banking. The present invention is applicable to use with any automatic pilot that applies restoring control moments to an aircraft in response to heading and bank signals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic control system for aircraft having stable heading and bank references and servo means controlled therefrom for applying corrective moments to the aircraft in heading and bank, means for biasing the control of both of said servo means from their references to initiate a banked turn, means sensitive to side slip or skid and constructed and arranged to supply a signal for modifying at least one of the biasing means in a sense to eliminate side slip and skid, and means for increasing and decreasing the relative strength of said side slip sensitive signal as a function of increasing and decreasing bank angle.

2. In an automatic pilot for aircraft having stable heading and bank reference means and servo means controlled therefrom for applying restoring moments to the aircraft in heading and bank; automatic turn coordination means comprising manually controlled means for applying signals to each of said servo means to initiate a banked turn, means responsive to energization of at least one of said servo means and constructed and arranged to supply a signal, proportional to such energization, to the heading servo means in a sense to reduce the energization of the latter servo means, and means under control of said manually controlled means, for varying the sensitivity of said servo energization responsive means, as a function of the position of said manually controlled means.

3. In an automatic pilot for aircraft having a servomotor operable to bank the craft and a servomotor operable to change the heading of the craft; a manually settable turn control knob, a first signal generator operated by said knob for supplying a signal to said banking servomotor to cause the craft to bank and turn, a second signal generator operated by said knob, means for providing a signal corresponding to side slip or skid of the craft in the turn, means for modifying the signal of said providing means in accordance with the setting of the control knob, means for combining the modified signal and the signal of second signal generator, and means for feeding the combined signal to the banking servomotor in opposition to the signal of said first generator.

4. An automatic pilot for aircraft as claimed in claim 3, also having means for normally disabling said side slip or skid signal and means brought into action by turning said knob away from its zero or straight flight position for rendering said signal operative.

5. In an automatic pilot for aircraft having heading and bank references, means for producing alternating current signals of amplitude and phase corresponding to amplitude and sense of deviation of the craft from a predetermined heading and bank attitude, amplifying and rectifying means for producing from said signals a direct current voltage of amplitude and polarity corresponding to the amplitude and phase of said signals, and direct current controlled servo means operated therefrom for applying restoring moments to the craft in heading and bank; automatic turn coordination means comprising alternating current controlled apparatus for modifying the heading reference signal to cause the craft to turn, manually settable means for supplying control alternating current to said heading signal modifying means, of amplitude and phase corresponding to the desired rate and sense of turn, means for diverting a portion of the direct current supplied to said heading servo means, a modulator supplied from said diverting means and having its alternating current output supplied in series with the alternating current output of said manually settable means, in a sense such as to adjust the heading modifying means in a sense to reduce the signal fed to the heading servo means, and means under control of the manually settable means for supplying a reference voltage to said modulator the amplitude of which varies with the extent of operation of the manually settable means but the phase of which is independent of the sense of operation of the manually settable means.

6. In an automatic pilot for aircraft having heading and bank references, means for producing alternating current signals of amplitude and phase corresponding to amplitude and sense of deviation of the craft from a predetermined heading and bank attitude, amplifying and rectifying means for producing from said signals a direct current voltage of amplitude and polarity corresponding to the amplitude and phase of said signals, and direct current controlled servo means operated therefrom for applying restoring moments to the craft in heading and bank; automatic turn coordination means comprising alternating current controlled apparatus for modifying the heading reference signal to cause the craft to turn, manually settable means for supplying control alternating current to said heading signal modifying means, of amplitude and phase corresponding to the desired rate and sense of turn, means for diverting a portion of said banking servo means signal, a modulator supplied from said diverting means and having its alternating current output supplied in series with the alternating current output of said manually settable means, in a sense such as to adjust the heading modifying means in a sense to reduce the signal fed to the heading servo means, and means under control of the manually settable means for supplying a reference voltage to said modulator the amplitude of which varies with the extent of operation of the manually settable means but the phase of which is independent of the sense of operation of the manually settable means.

7. In an automatic pilot for aircraft having stable heading and bank reference means and servo means controlled therefrom for applying restoring moments to the aircraft in turn and bank; automatic turn coordination means comprising means under manual control for applying primary signals to each of said servo means to cause a predetermined bank and a turn at a proportional rate, means constructed and arranged to furnish a second signal responsive to side slip of the aircraft, means for algebraically adding said second signal to one of said primary signals in a sense to eliminate side slip, and means for increasing the magnitude of the second signal as a function of the bank angle.

8. In an automatic pilot for aircraft, servo means for controlling the heading and banking of the craft, a common control means including means for providing a variable rate of turn reference for controlling said servo means to effect a turn at a selected rate and simultaneously a proportionate bank of said craft, signal means responsive to skid of the aircraft for altering the relation between such rate and banking angle until such skid is eliminated, means for integrating such signal with respect to time, and means for varying the output of said integrated signal with the bank angle of the craft.

9. An automatic control system for aircraft, including, in combination, adjustable means for causing a turn of the craft at some selected rate, adjustable means for causing a bank of the craft, manual control means for pre-setting, simultaneously, both the rate of turn and an approximately correct corresponding angle of bank, and auxiliary control means comprising a device responsive to an incorrect angle of bank, means operated by said device for causing a slow, continuous adjustment of the rate of turn until the angle of bank is correct, and means for increasing relative magnitude of such adjustment with increase in the angle of bank, set in by said bank causing means.

10. In an automatic pilot for aircraft having aileron and rudder control surfaces, servo means for controlling the ailerons, servo means for controlling the rudder, a single control means including means for setting in a desired angle of bank for controlling both said servo means to effect a desired bank of said craft and simultaneously a turn at a proportionate rate, means for automatically modifying the preset rate of turn of the craft upon persisting rudder deflection to eliminate such deflection, and means for additionally modifying said last-mentioned means in accordance with the angle of bank.

11. In an automatic pilot for aircraft having aileron and rudder control surfaces, servo means for controlling the ailerons, servo means for controlling the rudder, a single control means including means for setting in a desired angle of bank for controlling both said servo means to effect a desired bank of said craft and simultaneously a turn at a proportionate rate, means for automatically modifying the preset rate of turn of the craft upon persisting aileron deflection to eliminate such deflection, and means for additionally modifying said last-mentioned means in accordance with the angle of bank.

12. In an automatic control system for aircraft having stable heading and bank references and servo means controlled therefrom for applying corrective moments to the aircraft in heading and bank, means for biasing the control of both of said servo a first means from their references to initiate a banked turn, a second means responsive to a continuing signal to said bank servo means for modifying at least one of the first means in a sense to eliminate side slip, and a third means for increasing the relative strength of said second means as a function of increasing bank angle.

RICHARD S. BRANNIN.
PERCY HALPERT.
GEORGE F. JUDE.

REFERENCES CITED

The following references are of record in the file of this patent:

UNITED STATES PATENTS

| Number | Name | Date |
|---|---|---|
| 2,162,862 | Protzen | June 20, 1939 |
| 2,270,875 | Hanson et al. | Jan. 27, 1942 |
| 2,351,977 | Kronenberger et al. | June 20, 1944 |
| 2,371,388 | Glenny | Mar. 13, 1945 |
| 2,405,015 | Carlson | July 30, 1946 |
| 2,450,907 | Newton et al. | Oct. 12, 1948 |